United States Patent
You et al.

(10) Patent No.: US 12,541,047 B2
(45) Date of Patent: Feb. 3, 2026

(54) OPTICAL FILM, POLARIZING PLATE COMPRISING THE SAME, AND OPTICAL DISPLAY APPARATUS COMPRISING THE SAME

(71) Applicant: SAMSUNG SDI CO., LTD., Yongin-si (KR)

(72) Inventors: Jung Hun You, Suwon-si (KR); Yoon Jung Kim, Suwon-si (KR); Kyu Sik Kim, Suwon-si (KR); Ri Ra Jung, Suwon-si (KR); Kwang Ho Shin, Suwon-si (KR); Jun Mo Koo, Suwon-si (KR); Sang Hum Lee, Suwon-si (KR); Han Mam Jeong, Suwon-si (KR); Eun Su Park, Suwon-si (KR)

(73) Assignee: Wuxi Hengxin Optoelectronic Materials Co., Ltd., Wuxi (CN)

( * ) Notice: Subject to any disclaimer, the term of this patent is extended or adjusted under 35 U.S.C. 154(b) by 727 days.

(21) Appl. No.: 17/863,054

(22) Filed: Jul. 12, 2022

(65) Prior Publication Data

US 2023/0037037 A1 Feb. 2, 2023

(30) Foreign Application Priority Data

Jul. 13, 2021 (KR) ........................ 10-2021-0091748

(51) Int. Cl.
*G02B 5/30* (2006.01)
*C09D 123/02* (2006.01)
*C09D 125/06* (2006.01)
*C09D 127/24* (2006.01)
*C09D 175/14* (2006.01)
(Continued)

(52) U.S. Cl.
CPC ......... *G02B 5/305* (2013.01); *C09D 123/025* (2013.01); *C09D 125/06* (2013.01); *C09D 127/24* (2013.01); *C09D 175/14* (2013.01); *G02B 1/04* (2013.01); *G02B 1/18* (2015.01); *G02B 5/3091* (2013.01)

(58) Field of Classification Search
None
See application file for complete search history.

(56) References Cited

U.S. PATENT DOCUMENTS

2003/0060589 A1 3/2003 Shimizu et al.
2022/0187522 A1 6/2022 Kim et al.

FOREIGN PATENT DOCUMENTS

KR 10-2003-0017343 A 3/2003
KR 10-2013-0103595 A 9/2013
(Continued)

OTHER PUBLICATIONS

Korean Office Action dated Oct. 2, 2024, issued in corresponding Korean Patent Application No. 10-2021-0091748 (7 pages).

*Primary Examiner* — Jeffrey D Washville
(74) *Attorney, Agent, or Firm* — Ricky Lam

(57) ABSTRACT

An optical film, a polarizing plate including the same, and an optical display apparatus including the same are provided. An optical film includes a first layer and a second layer stacked on a lower surface of the first layer via a first primer layer, the first primer layer being formed of a first composition including a first urethane-based polymer and a first isocyanate-based curing agent, the first urethane-based polymer including a repeat unit derived from a first alicyclic isocyanate-based compound, and the first isocyanate-based curing agent including a first isocyanate trimer.

20 Claims, 2 Drawing Sheets

(51) Int. Cl.
*G02B 1/04* (2006.01)
*G02B 1/18* (2015.01)

(56) References Cited

FOREIGN PATENT DOCUMENTS

| KR | 10-2020-0116837 A | 10/2020 |
| KR | 10-2020-0144919 A | 12/2020 |

OPTICAL FILM, POLARIZING PLATE COMPRISING THE SAME, AND OPTICAL DISPLAY APPARATUS COMPRISING THE SAME

CROSS-REFERENCE TO RELATED APPLICATION

This application claims priority to and the benefit of Korean Patent Application No. 10-2021-0091748, filed on Jul. 13, 2021 in the Korean Intellectual Property Office, the entire disclosure of which is incorporated herein by reference.

BACKGROUND

1. Field

Aspects of embodiments of the present invention relate to an optical film, a polarizing plate including the same, and an optical display apparatus including the same.

2. Description of the Related Art

An organic light emitting diode display can suffer from deterioration in visibility and contrast due to reflection of external light. To solve this problem, a polarizing plate including a polarizer and a retardation film may be stacked on a light emitting diode panel. The retardation film is interposed between the polarizer and the light emitting diode panel. The retardation film is generally composed of at least two retardation films having different phase retardations in order to provide more complete antireflection.

In recent years, with a trend toward reduction in thickness of a polarizing plate, various attempts to reduce the thickness of the retardation films in the polarizing plate have been made. For example, the thickness of the polarizing plate may be further reduced by forming a coating layer exhibiting phase retardation on the retardation film, instead of bonding two retardation films exhibiting different phase retardations.

A film having the coating layer exhibiting phase retardation on the retardation film may be formed by coating a composition for the coating layer on a retardation film or a non-retardation film as a base film, followed by stretching the entirety of the coating layer and the base layer at high temperature. As a result, both the film and the coating layer can secure phase retardation for an antireflection function.

However, the film is separated from the coating layer in the course of stretching at high temperature, thereby making it difficult to achieve desired phase retardation. Although there is a method in which the film and the coating layer exhibiting phase retardation are separately manufactured and bonded to each other via an adhesive layer through transfer, addition of the adhesive layer can obstruct reduction in thickness of the polarizing plate and can cause deterioration in processability.

The background technique of the present invention is disclosed in KR Patent Laid-open Publication No. 10-2013-0103595 and the like.

SUMMARY

According to an aspect of embodiments of the present invention, an optical film that exhibits good peel strength between layers including different materials and has low haze to secure good optical transparency is provided.

According to another aspect of embodiments of the present invention, an optical film that includes a primer layer having low variation in shape and/or properties even after a stretching process in manufacture of the optical film to improve durability and processability when dipped in water at high temperature is provided.

According to another aspect of embodiments of the present invention, an optical film that includes a primer layer not affecting an antireflection function is provided.

Aspects of one or more embodiments of the present invention relate to an optical film.

According to one or more embodiments, an optical film includes: a first layer; and a second layer stacked on a lower surface of the first layer via a first primer layer, the first primer layer being formed of a first composition including a first urethane-based polymer and a first isocyanate curing agent, wherein the first urethane-based polymer includes a repeat unit derived from a first alicyclic isocyanate-based compound, and the first isocyanate-based curing agent includes a first isocyanate-based trimer.

In one or more embodiments, the first alicyclic isocyanate-based compound may include at least one selected from among methylene bis(cyclohexyl isocyanate), cyclohexylene diisocyanate, cyclopentylene diisocyanate, 1,4-bis(isocyanatomethyl)cyclohexane, 1,3-bis(diisocyanatomethyl)cyclohexane, 3,5,5-trimethyl-3-isocyanatomethyl cyclohexane, and isophorone diisocyanate.

In one or more embodiments, the first isocyanate-based trimer may include a compound represented by the following Formula 3:

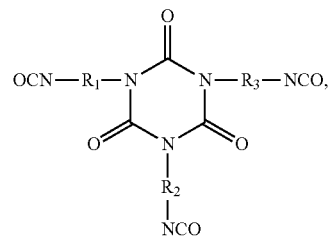

Formula 3 where $R_1$, $R_2$, and $R_3$ are each independently a substituted or unsubstituted $C_1$ to $C_{10}$ alkylene group, a substituted or unsubstituted $C_3$ to $C_{10}$ cycloalkylene group, or a substituted or unsubstituted $C_6$ to $C_{10}$ arylene group.

In one or more embodiments, the first isocyanate-based trimer may include at least one selected from among a hexamethylene diisocyanate trimer and an isophorone diisocyanate trimer.

In one or more embodiments, the first isocyanate-based curing agent may be present in an amount of 20 parts by weight to 160 parts by weight relative to 100 parts by weight of the first urethane-based polymer.

In one or more embodiments, the first primer layer may have a glass transition temperature of higher than 60° C.

In one or more embodiments, the first layer and the second layer may be formed of different materials and may exhibit different birefringence.

In one or more embodiments, each of the first layer and the second layer may be a hydrophobic layer.

In one or more embodiments, the first layer may include at least one selected from among a cyclic olefin polymer (COP) resin and a cyclic olefin copolymer (COC), and the second layer may include a halogen-containing polystyrene-based polymer.

In one or more embodiments, a halogen of the halogen-containing polystyrene-based polymer may be fluorine.

In one or more embodiments, the halogen-containing polystyrene-based polymer may include a repeat unit represented by the following Formula 1:

Formula 1

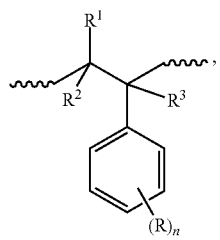

where ⌇⌇⌇⌇⌇ is a linking site; $R^1$, $R^2$, and $R^3$ are each independently a hydrogen atom, an alkyl group, a substituted alkyl group, or a halogen; each R is independently an alkyl group, a substituted alkyl group, a halogen, a hydroxyl group, a carboxyl group, a nitro group, an alkoxy group, an amino group, a sulfonate group, a phosphate group, an acyl group, an acyloxy group, a phenyl group, an alkoxy carbonyl group, or a cyano group, at least one of $R^1$, $R^2$, and $R^3$ being a halogen and/or at least one R being a halogen; and n is an integer of 0 to 5.

In one or more embodiments, the first layer may have an in-plane retardation of 180 nm to 240 nm at a wavelength of 550 nm, and the second layer may have an in-plane retardation of 70 nm to 120 nm at a wavelength of 550 nm.

In one or more embodiments, the polarizer may further include a third layer stacked on an upper surface of the first layer via a second primer layer.

In one or more embodiments, the first layer and the third layer may be formed of different materials and may exhibit different birefringence.

In one or more embodiments, the first layer may include at least one selected from among a cyclic olefin polymer (COP) resin and a cyclic olefin copolymer (COC), and the third layer may include a halogen-containing polystyrene-based polymer.

In one or more embodiments, the halogen-containing polystyrene-based polymer may include a repeat unit represented by the following Formula 1:

Formula 1

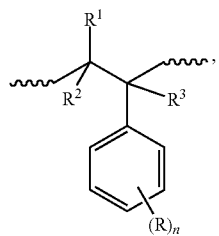

where ⌇⌇⌇⌇⌇ is a linking site; $R^1$, $R^2$, and $R^3$ are each independently a hydrogen atom, an alkyl group, a substituted alkyl group, or a halogen; Rs are each independently an alkyl group, a substituted alkyl group, a halogen, a hydroxyl group, a carboxyl group, a nitro group, an alkoxy group, an amino group, a sulfonate group, a phosphate group, an acyl group, an acyloxy group, a phenyl group, an alkoxy carbonyl group, or a cyano group, at least one of $R^1$, $R^2$, and $R^3$ being a halogen and/or at least one R being a halogen; and n is an integer of 0 to 5.

In one or more embodiments, the second primer layer may be formed of a second composition including a second urethane-based polymer and a second isocyanate-based curing agent, the second urethane-based polymer including a repeat unit derived from a second alicyclic isocyanate-based compound, the second isocyanate-based curing agent including a second isocyanate-based trimer.

In one or more embodiments, the second isocyanate-based trimer may include at least one selected from among a hexamethylene diisocyanate trimer and an isophorone diisocyanate trimer, and the second alicyclic isocyanate-based compound may include at least one selected from among methylene bis(cyclohexyl isocyanate), cyclohexylene diisocyanate, cyclopentylene diisocyanate, 1,4-bis(isocyanatomethyl)cyclohexane, 1,3-bis(diisocyanatomethyl)cyclohexane, 3,5,5-trimethyl-3-isocyanatomethyl cyclohexane, and isophorone diisocyanate.

Aspects of one or more embodiments of the present invention relate to a polarizing plate.

In one or more embodiments, a polarizing plate includes a polarizer and the optical film according to an embodiment of the present invention stacked on a surface of the polarizer.

Aspects of one or more embodiments of the present invention relate to an optical display apparatus.

In one or more embodiments, an optical display apparatus includes the polarizing plate according to an embodiment of the present invention.

One or more embodiments of the present invention provide an optical film that exhibits good peel strength between layers including different materials and has low haze to secure good optical transparency.

Further, one or more embodiments of the present invention provide an optical film that includes a primer layer having low variation in shape and/or properties even after a stretching process in manufacture of the optical film to improve durability and processability when dipped in water at high temperature.

Further, one or more embodiments of the present invention provides an optical film that includes a primer layer not affecting an antireflection function.

DETAILED DESCRIPTION

Figure 1:
FIG. 1 is a cross-sectional view of a polarizing plate according to an embodiment of the present invention.

Herein, some embodiments of the present invention will be described in further detail with reference to the accompanying drawings to provide a thorough understanding of the invention to those skilled in the art. It is to be understood that the present invention may be embodied in various ways and is not limited to the following embodiments. In the drawings, components unrelated to description may be omitted for clear description of the invention, and like components are denoted by like reference numerals throughout the specification. Although lengths, thicknesses, or widths of various components may be exaggerated for understanding in the drawings, the present invention is not limited thereto.

Herein, "in-plane retardation (Re)," "out-of-plane retardation (Rth)," and "degree of biaxiality (NZ)" are represented by the following Equations A, B, and C, respectively:

$$Re=(nx-ny)\times d, \qquad A;$$

$$Rth=((nx+ny)/2-nz)\times d, \qquad B;$$

$$NZ=(nx-nz)/(nx-ny), \qquad C,$$

where nx, ny, and nz are indexes of refraction of an optical device in the slow axis direction, the fast axis direction, and the thickness direction of the optical device at a measurement wavelength, respectively, and d is the thickness of the optical device (unit: nm). In Equations A to C, the measurement wavelength may be about 450 nm, about 550 nm, or about 650 nm.

Herein, "short wavelength dispersion" refers to Re(450)/Re(550) and "long wavelength dispersion" refers to Re(650)/Re(550), wherein Re(450), Re(550), and Re(650) refer to in-plane retardation (Re) of a single retardation layer or a laminate of retardation layers at wavelengths of about 450 nm, about 550 nm, and about 650 nm, respectively.

As used herein to represent an angle, "+" means a counterclockwise direction about a reference, and "−" means a clockwise direction about the reference.

As used herein, "(meth)acryl" may mean acryl and/or methacryl.

As used herein to represent a specific numerical range, the expression "X to Y" means greater than or equal to X and less than or equal to Y (X≤ and ≤Y).

An optical film according to one or more embodiments of the present invention includes a first layer and a second layer stacked on a lower surface of the first layer. The optical film may further include a third layer on an upper surface of the first layer. The optical film may be a laminate of retardation layers for antireflection, which is included in a polarizing plate for antireflection to provide an antireflection function.

The first layer is formed of a different material than the second layer and the third layer. The optical film according to embodiments of the present invention has good peel strength between the first layer and the second layer formed of different materials and between the first layer and the third layer formed of different materials while securing low haze to provide good optical transparency.

In addition, the optical film according to embodiments of the present invention includes a primer layer that does not affect the antireflection function caused by the first layer, the second layer, and the third layer. As described below, the optical film according to embodiments of the present invention may be manufactured by concurrently (e.g., simultaneously) stretching a non-stretched or partially stretched film for the first layer and a coating layer for the second layer. Here, the optical film according to one or more embodiments of the present invention includes the primer layer that suppresses variation in shape and/or properties of the first and second layers even after a stretching process in manufacture of the optical film, whereby the first layer and the second layer can realize desired phase retardation, thereby improving durability and processability when dipped in water at high temperature.

In an embodiment, each of peel strength between the first layer and the second layer and between the first layer and the third layer may be 200 gf/25 mm or more, and, in an embodiment, 200 gf/25 mm, 250 gf/25 mm, 300 gf/25 mm, 350 gf/25 mm, 400 gf/25 mm, 450 gf/25 mm, or 500 gf/25 mm, for example, 200 gf/25 mm to 500 gf/25 mm.

In an embodiment, the optical film may have a haze of 0.5% or less, and, in an embodiment, 0.01%, 0.05%, 0.1%, 0.15%, 0.2%, 0.25%, 0.3%, 0.35%, 0.4%, 0.45%, or 0.5%, for example, 0.01% to 0.5%, and, in an embodiment, 0.01% to 0.3%. Within this range, the optical film does not affect the antireflection function. In an embodiment, the optical film may have a luminous transmittance of 90% or more, for example, 90% to 100%. Within this range, the optical film can be used in a polarizing plate.

Herein, an optical film according to an embodiment of the present invention will be described in further detail.

According to an embodiment, an optical film includes a first layer and a second layer stacked on a lower surface of the first layer via a first primer layer formed of a composition including a urethane-based polymer and an isocyanate-based curing agent, wherein the urethane-based polymer includes a repeat unit derived from an alicyclic isocyanate-based compound, and the isocyanate-based curing agent includes an isocyanate-based trimer.

In an embodiment, the optical film may further include a third layer stacked on an upper surface of the first layer via a second primer layer. The second primer layer may be formed of a same composition as the first primer layer. Accordingly, the optical film may include the first layer, the second layer stacked on the lower surface of the first layer via the first primer layer, and the third layer stacked on the upper surface of the first layer via the second primer layer.

First Layer

The first layer may be a layer exhibiting substantially no in-plane retardation. In an embodiment, the first layer is a retardation layer and has in-plane retardation within a predetermined range such that the optical film can provide the antireflection function.

In an embodiment, the first layer may have an in-plane retardation of 180 nm to 240 nm at a wavelength of 550 nm. As a result, the first layer can achieve remarkable reduction in reflectivity at front and lateral sides while improving ellipticity (degree of circular polarization) at the lateral side when combined with the second layer exhibiting in-plane retardation at a wavelength of 550 nm. In an embodiment, the first layer may have an in-plane retardation of 180 nm, 185 nm, 190 nm, 195 nm, 200 nm, 205 nm, 210 nm, 215 nm, 220 nm, 225 nm, 230 nm, 235 nm, or 240 nm, and, in an embodiment, 180 nm to 235 nm.

In an embodiment, the first layer exhibits positive dispersion and may have a short wavelength dispersion of 1 to 1.1 and a long wavelength dispersion of 0.96 to 1. Within this range, the optical film can reduce reflectivity at front and lateral sides while improving ellipticity, when used in a polarizing plate. In an embodiment, for example, the first layer has a short wavelength dispersion of 1, 1.01, 1.02, 1.03, 1.04, 1.05, 1.06, 1.07, 1.08, 1.09, 1.1, and, in an embodiment, 1.03 to 1.1 and a long wavelength dispersion of 0.96, 0.97, 0.98, 0.99, 1, and, in an embodiment, 0.98 to 1, and, in an embodiment, 0.99 to 1, and, in an embodiment, 0.995 to 1.

In an embodiment, the first layer may have an in-plane retardation of 180 nm to 280 nm, and, in an embodiment, 185 nm to 260 nm, and, in an embodiment, 190 nm to 250 nm, at a wavelength of 450 nm, and an in-plane retardation of 175 nm to 270 nm, and, in an embodiment, 180 nm to 255 nm, and, in an embodiment, 185 nm to 240 nm, at a wavelength of 650 nm. Within this range, the first layer can achieve the short wavelength dispersion and the long wavelength dispersion within the above ranges.

In an embodiment, the first layer may have an out-of-plane retardation of 80 nm to 250 nm, and, in an embodiment, 80 nm, 90 nm, 100 nm, 110 nm, 120 nm, 130 nm, 140 nm, 150 nm, 160 nm, 170 nm, 180 nm, 190 nm, 200 nm, 210 nm, 220 nm, 230 nm, 240 nm, or 250 nm, and, in an embodiment, 95 nm to 200 nm, and, in an embodiment, 105 nm to 180 nm, at a wavelength of 550 nm. Within this range, the first layer can improve lateral reflectivity.

In an embodiment, the first layer may have a biaxiality of 1 to 1.5, and, in an embodiment, 1, 1.05, 1.1, 1.15, 1.2, 1.25, 1.3, 1.35, 1.4, 1.45, or 1.5, and, in an embodiment, 1 to 1.3, and, in an embodiment, 1.1 to 1.3, at a wavelength of 550 nm. Within this range, the first layer can improve lateral reflectivity.

In an embodiment, the first layer may have a thickness of 70 μm or less, for example, greater than 0 μm to 70 μm, or 20 μm to 70 μm, and, in an embodiment, 20 μm to 50 μm. Within this range, the first layer can be used in the optical film.

The first layer is a non-liquid crystalline film and may include a stretched film formed of an optically transparent resin. The term "non-liquid crystalline film" may mean a film that is not formed of at least one of a liquid crystal monomer, a liquid crystal oligomer, and a liquid crystal polymer, or is formed of a material that is not converted into a liquid crystal monomer, a liquid crystal oligomer, or a liquid crystal polymer by light irradiation.

For example, the first layer may include at least one selected from among a cellulose-based resin including triacetylcellulose and the like, a polyester-based resin including polyethylene terephthalate (PET), polybutylene terephthalate, polyethylene naphthalate, polybutylene naphthalate, and the like, a cyclic olefin copolymer (COC) resin, a cyclic olefin polymer (COP), a polycarbonate-based resin, a polyethersulfone-based resin, a polysulfone-based resin, a polyamide-based resin, a polyimide-based resin, a polyolefin-based resin, a polyarylate-based resin, a polyvinyl alcohol-based resin, a polyvinyl chloride-based resin, and a polyvinylidene chloride-based resin.

In an embodiment, the first layer includes a cyclic olefin polymer (COP) film in order to secure the short wavelength dispersion and the long wavelength dispersion within the above range. The cyclic polyolefin film can provide advantageous effects in improvement of front reflectivity in the polarizing plate according to the present invention and can secure good peel strength when applied to the first primer layer.

The first layer may be a hydrophobic film. The first primer layer according to embodiments of the present invention can exhibit good adhesion with respect to the hydrophobic film. For example, the hydrophobic film may include a cyclic olefin polymer (COP) film and/or a cyclic olefin copolymer (COC) film.

The first layer may include a film formed of a resin having positive (+) inherent birefringence. The first primer layer according to the present invention can exhibit good adhesion with respect to the film formed of a resin having positive (+) inherent birefringence.

In an embodiment, the first layer may have the aforementioned retardation by forming the first primer layer on a non-stretched film for the first layer and forming a coating for a coating layer, followed by concurrently (e.g., simultaneously) stretching a laminate of the non-stretched film, the first primer layer and the coating for the coating layer. In another embodiment, the first layer may have the aforementioned retardation by forming the first primer layer on a partially stretched film for the first layer and forming a coating for a coating layer, followed by concurrently (e.g., simultaneously) stretching a laminate of the partially stretched film, the first primer layer, and the coating for the coating layer. In an embodiment, the first layer is formed by the latter process in order to secure the effects of the present invention. This will be described below in further detail.

Second Layer

The second layer is formed on a lower surface of the first primer layer. Although the second layer may be a layer exhibiting substantially no in-plane retardation, in an embodiment, the second layer has an in-plane retardation of 70 nm to 120 nm at a wavelength of 550 nm to provide the antireflection function. As a result, the second layer can achieve remarkable reduction in reflectivity at the front and lateral sides while improving ellipticity (degree of circular polarization) at the lateral side when combined with the first layer. In an embodiment, the second layer may have an in-plane retardation of 70 nm, 75 nm, 80 nm, 85 nm, 90 nm, 95 nm, 100 nm, 105 nm, 110 nm, 115 nm, or 120 nm, and, in an embodiment, 80 nm to 115 nm, and, in an embodiment, 90 nm to 110 nm, at a wavelength of 550 nm.

In an embodiment, the second layer exhibits positive dispersion and may have a short wavelength dispersion of 1 to 1.15 and a long wavelength dispersion of 0.94 to 1. Within this range, the second layer can improve ellipticity at each wavelength through reduction in wavelength dispersion, as compared to the first layer, thereby improving reflectivity. In an embodiment, for example, the second layer has a short wavelength dispersion of 1, 1.01, 1.02, 1.03, 1.04, 1.05, 1.06, 1.07, 1.08, 1.09, 1.1, 1.11, 1.12, 1.13, 1.14, or 1.15, and, in an embodiment, 1 to 1.06 and a long wavelength dispersion of 0.94, 0.95, 0.96, 0.97, 0.98, 0.99, 1, and, in an embodiment, 0.97 to 1.

In an embodiment, the second layer may have an in-plane retardation of 80 nm to 120 nm, and, in an embodiment, 85 nm to 115 nm, and, in an embodiment, 90 nm to 110 nm, at a wavelength of 450 nm, and an in-plane retardation of 80 nm to 110 nm, and, in an embodiment, 85 nm to 105 nm, at a wavelength of 650 nm. Within this range, the second layer can easily achieve the short wavelength dispersion and the long wavelength dispersion within the above ranges.

In an embodiment, the second layer may have an out-of-plane retardation of −250 nm to −50 nm, and, in an embodiment, −250 nm, −245 nm, −240 nm, −235 nm, −230 nm, −225 nm, −220 nm, −215 nm, −210 nm, −205 nm, −200 nm, −195 nm, −190 nm, −185 nm, −180 nm, −175 nm, −170 nm, −165 nm, −160 nm, −155 nm, −150 nm, −145 nm, −140 nm, −135 nm, −130 nm, −125 nm, −120 nm, −115 nm, −110 nm, −105 nm, −100 nm, −95 nm, −90 nm, −85 nm, −80 nm, −75 nm, −70 nm, −65 nm, −60 nm, −55 nm or −50 nm, and, in an embodiment, −150 nm to −60 nm, at a wavelength of 550 nm. Within this range, the second layer can improve lateral reflectivity through improvement in ellipticity at the lateral side.

In an embodiment, the second layer may have a biaxiality of −2 to −0.1, and, in an embodiment, −2, −1.9, −1.8, −1.7, −1.6, −1.5, −1.4, −1.3, −1.2, −1.1, −1.0, −0.9, −0.8, −0.7, −0.6, −0.5, −0.4, −0.3, −0.2 or −0.1, and, in an embodiment, −1.5 to −0.1, and, in an embodiment, −0.5 to −0.1, at a wavelength of 550 nm. Within this range, the second layer can improve lateral reflectivity through improvement in ellipticity at the lateral side.

In an embodiment, the second layer may have a total luminous transmittance of 90% or more, for example, 90% to 100%, and a haze of 2% or less, for example, 0% to 2%, or 0.5% to 2%. Within this range, the second layer can be used in the optical film.

In an embodiment, the second layer may have a thickness of 10 μm or less, for example, greater than 0 μm to 10 μm, or 1 μm to 10 μm, and, in an embodiment, 2 μm to 8 μm. Within this range, the optical film can achieve thickness reduction.

In an embodiment, the second layer has a lower index of refraction than the first layer and may have an index of refraction of 1 to 2, for example 1, 1.1, 1.2, 1.3, 1.4, 1.5, 1.6, 1.7, 1.8, 1.9, or 2, and, in an embodiment, 1.4 to 1.6, and, in an embodiment, 1.5 to 1.6. Within this range, the second layer can assist in reduction of haze of the optical film while improving transparency of the optical film through control of the index of refraction with respect to the first layer.

The second layer may be formed of a different material than the first layer to have different birefringence than the first layer and may be formed of a hydrophobic material having negative (−) inherent birefringence. The first primer layer according to the present invention may exhibit good adhesion with respect to the hydrophobic material having negative (−) inherent birefringence.

In an embodiment, the second layer includes halogen, and, in an embodiment, a fluorene-containing polystyrene-based polymer, as a main component. According to the present invention, in consideration of the above retardation and wavelength dispersion while allowing easy reduction in thickness of the polarizing plate, the second layer is formed of a composition containing halogen, and, in an embodiment, a fluorene-containing polystyrene-based polymer. Herein, "polymer" includes an oligomer, a polymer, or a resin. Herein, "main component" means a component that is present in an amount of 95 wt % or more, such as 95 wt % to 99 wt %, in the second layer.

The halogen-containing polystyrene-based polymer may include a repeat unit represented by the following Formula 1:

Formula 1

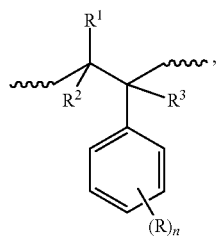

where ⌇⌇⌇⌇ is a linking site; $R^1$, $R^2$, and $R^3$ are each independently a hydrogen atom, an alkyl group, a substituted alkyl group, or a halogen; each R is independently an alkyl group, a substituted alkyl group, a halogen, a hydroxyl group, a carboxyl group, a nitro group, an alkoxy group, an amino group, a sulfonate group, a phosphate group, an acyl group, an acyloxy group, a phenyl group, an alkoxy carbonyl group, or a cyano group, at least one of $R^1$, $R^2$, and $R^3$ being a halogen and/or at least one R being a halogen; and n is an integer of 0 to 5.

In an embodiment, the halogen may be fluorine.

The halogen-containing polystyrene-based polymer may be formed through polymerization of, for example, a mixture containing 1-(2,2-difluoroethenyl)-2-fluorobenzene and/or 1',2',2'-trifluorostyrene. The mixture may further include styrene.

The composition for the second layer may further include additives. In an embodiment, the additives may adjust wavelength dispersion. An aromatic fused ring-containing additive may include 2-naphthylbenzoate, anthracene, phenanthrene, 2,6-naphthalene dicarboxylic acid diester, and the like. In an embodiment, the aromatic fused ring-containing additive may be present in an amount of 0.1 wt % to 30 wt %, and, in an embodiment, 1 wt % to 10 wt %, in the composition for the second layer. Within this range, the composition for the second layer can adjust exhibition of retardation and wavelength dispersion. The composition for the second layer may further include typical additives known to those skilled in the art. The additives may include any of a pigment, an antioxidant, an antistatic agent, and a heat stabilizer, without being limited thereto.

First Primer Layer

As described below, the optical film is prepared by coating a composition for the second layer on a lower surface of a non-stretched or partially stretched film for the first layer to form a coating for a coating layer, followed by stretching the entirety of the film and the coating. The first primer layer improves processability while securing the retardation and wavelength dispersion within the above ranges by preventing or substantially preventing the film from being separated from the coating layer in the course of stretching at high temperature. The first primer layer improves reliability of the optical film by increasing peel strength between the film and the coating layer. The first primer layer secures good peel strength between the retardation layers including different materials while improving compatibility between these materials, thereby providing an optical film exhibiting low haze to provide good optical transparency. The first primer layer does not affect the antireflection function of the optical film.

In an embodiment, the first primer layer may have a glass transition temperature of higher than 60° C., and, in an embodiment, 65° C., 70° C., 75° C., 80° C., 85° C., 90° C., 95° C., 100° C., 105° C., 110° C., 115° C., 120° C., 125° C., 130° C., 135° C., 140° C., 145° C., or 150° C., for example, higher than 60° C. to 150° C., 75° C. or more, or 75° C. to 130° C. Within this range, the first primer layer can realize phase retardation even without separation between the first layer and the second layer upon stretching at high temperature and can secure good reliability without separation between the first primer layer and the first layer or the second layer in reliability evaluation at high temperature (left under conditions of 85° C. and 85% RH (relative humidity) for 500 hours) in this state. In addition, with the glass transition temperature described above, the first primer layer exhibits sufficient crystallization when dipped in water at high temperature (85° C.) for 1 hour, thereby securing good peel strength without increase in haze.

In an embodiment, the first primer layer is a urethane-based primer layer and is formed of a composition including a urethane-based polymer and an isocyanate-based curing agent, in which the urethane-based polymer includes a repeat unit derived from an alicyclic isocyanate-based compound, and the isocyanate-based curing agent includes an isocyanate-based trimer. As a result, the first primer layer can provide all of the aforementioned effects. A primer layer formed of an isocyanate-based trimer-free composition as the isocyanate-based curing agent cannot be used due to low peel strength between the first layer and the second layer. A primer layer formed of a composition including a urethane-based polymer free from the repeat unit derived from an alicyclic isocyanate-based compound has low peel strength and is peeled off of the first layer or the second layer when completely dipped in water at 100° C. for 1 hour, thereby causing poor reliability.

The urethane-based polymer includes the repeat unit derived from an alicyclic isocyanate-based compound. With the repeat unit derived from an alicyclic isocyanate-based compound, the first primer layer can more easily realize all of the aforementioned effects.

The alicyclic isocyanate-based compound may include a bi- or higher functional isocyanate-based compound, and, in an embodiment, a bifunctional isocyanate compound, containing a substituted or unsubstituted $C_6$ to $C_{10}$ alicyclic group. For example, the alicyclic isocyanate-based compound may include at least one selected from among methylene bis(cyclohexyl isocyanate), cyclohexylene diisocyanate, cyclopentylene diisocyanate, 1,4-bis(isocyanatomethyl)cyclohexane, 1,3-bis(diisocyanatomethyl)cyclohexane, 3,5,5-trimethyl-3-isocyanatomethyl cyclohexane, and isophorone diisocyanate. In an embodiment, the alicyclic isocyanate-based compound is isophorone diisocyanate to allow easy realization of the effects of the present invention. In an embodiment, the alicyclic isocyanate-based compound is a substituted or unsubstituted cyclohexyl group-containing bi- or higher functional isocyanate-based compound. In an embodiment, the alicyclic isocyanate-based compound may include at least one selected from among methylene bis(cyclohexyl isocyanate), cyclohexylene diisocyanate, 1,4-bis(isocyanatomethyl)cyclohexane, 1,3-bis(diisocyanatomethyl)cyclohexane, 3,5,5-trimethyl-3-isocyanatomethyl cyclohexane, and isophorone diisocyanate.

The urethane-based polymer may be prepared by a typical polymerization method using a polyol and the alicyclic isocyanate-based compound together with a catalyst. The polyol may include at least one selected from among a polyether-based polyol, a polyester-based polyol, a polyacrylic-based polyol, a polycaprolactone-based polyol, and a polycarbonate-based polyol. The polyol may include at least one selected from among a diol, a triol, and a tetraol. In an embodiment, the alicyclic isocyanate-based compound may be present in an amount of 50 parts by weight to 200 parts by weight, and, in an embodiment, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199 or 200 parts by weight, and, in an embodiment, 50 parts by weight to 150 parts by weight, relative to 100 parts by weight of the polyol. The catalyst is a tin compound and may include dibutyl tin dilaurate (DBTDL) and tin 2-ethylhexanoate, without being limited thereto. The urethane-based polymer may be prepared by heating a polyol mixture in a reactor at a temperature of 80° C. to 100° C. for 10 minutes to 30 minutes to achieve complete removal of remaining water while purging with nitrogen, reducing the inner temperature of the reactor to a temperature of 65° C. to 70° C., and adding an alicyclic isocyanate-based compound and a catalyst to the reactor, followed by primary polymerization at 65° C. to 75° C. for 3 hours to 4 hours and secondary polymerization at 75° C. to 85° C. for 60 minutes to 120 minutes.

In an embodiment, the urethane-based polymer may have a glass transition temperature of 20° C. to 100° C., and, in an embodiment, 20° C., 25° C., 30° C., 35° C., 40° C., 45° C., 50° C., 55° C., 60° C., 65° C., 70° C., 75° C., 80° C., 85° C., 90° C., 95° C., or 100° C., and, in an embodiment, 50° C. to 70° C. Within this range, the effects of the present invention can be easily realized.

In an embodiment, the isocyanate-based trimer has a moiety of the following Formula 2 through adduct reaction of three isocyanate-based curing agents to easily realize the effects of the present invention.

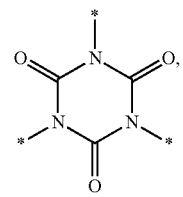

Formula 2 where * is a linking site of an element.

The isocyanate-based curing agent may be a tri- or higher functional, and, in an embodiment, a tri- to penta-functional isocyanate-based curing agent.

The isocyanate-based trimer may include a compound represented by the following Formula 3, without being limited thereto:

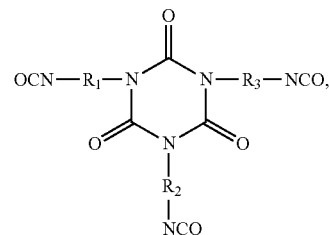

Formula 3 where $R_1$, $R_2$, and $R_3$ are each independently a substituted or unsubstituted $C_1$ to $C_{10}$ alkylene group, a substituted or unsubstituted $C_3$ to $C_{10}$ cycloalkylene group, or a substituted or unsubstituted $C_6$ to $C_{10}$ arylene group.

In an embodiment, the isocyanate-based trimer may be an aliphatic alkylene diisocyanate-based trimer and may include at least selected from among, for example, a hexamethylene diisocyanate trimer and an isophorone diisocyanate trimer.

In an embodiment, in terms of sold content, the isocyanate-based curing agent may be present in an amount of 20 parts by weight to 160 parts by weight, and, in an embodiment, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, or 160 parts by weight, and, in an embodiment, 30 parts by weight to 120 parts by weight, and, in an embodiment, 38 parts by weight to 115 parts by weight, relative to 100 parts by weight of the urethane-based polymer. Within this range of the isocyanate curing agent, the first primer layer can secure good peel strength and prevent or substantially prevent deterioration in optical transparency due to remaining isocyanate-based curing agent.

In an embodiment, the isocyanate-based trimer may be present in an amount of 90 wt % or more, and, in an embodiment, 90 wt %, 91 wt %, 92 wt %, 93 wt %, 94 wt %, 95 wt %, 96 wt %, 97 wt %, 98 wt %, 99 wt %, or 100 wt %, in isocyanate-based curing agent.

The composition for the first primer layer may further include a water-based solvent. An organic solvent can provide poor properties in terms of haze and compatibility by melting the first layer and the second layer or by melting the first primer layer due to remaining organic solvent, whereas the water-based solvent does not suffer from such problems. The water-based solvent may be water including ultrapure water, without being limited thereto. The water-based solvent may be present in the balance amount in the composition. According to embodiments of the present invention, the composition for the primer layer contains the water-based solvent and increases peel strength between the first layer and the second layer without increase in haze by improving compatibility between the first layer and the second layer.

In an embodiment, in the composition for the first primer layer, at least one of a polyester-based resin, a (meth)acrylic-based resin, a urethane (meth)acrylate-based resin, and a polyamide-based resin may be present in an amount of 5 wt % or less, and, in an embodiment, 0 wt %, 0.5 wt %, 1 wt %, 1.5 wt %, 2 wt %, 2.5 wt %, 3 wt %, 3.5 wt %, 4 wt %, 4.5 wt %, or 5 wt %, and, in an embodiment, 0 wt % to 5 wt %, and, in an embodiment, 0 wt %, in terms of solid content.

In an embodiment, the composition for the first primer layer may be free from particles, such as inorganic particles and organic particles.

The composition for the first primer layer may further include typical additives known to those skilled in the art.

In an embodiment, the first primer layer may have a thickness of 500 nm or less, and, in an embodiment, greater than 0 nm, 50 nm, 100 nm, 150 nm, 200 nm, 250 nm, 300 nm, 350 nm, 400 nm, 450 nm, or 500 nm, for example, greater than 0 nm to 500 nm, and, in an embodiment, 100 nm to 500 nm, and, in an embodiment, 150 nm to 300 nm. Within this range, the first primer layer can improve reliability of the first layer and the second layer.

Third Layer

The third layer can further improve lateral reflectivity. Although the third layer may be a layer exhibiting substantially no in-plane retardation, the third layer may include a positive C layer satisfying a relation: $nz > nx \approx ny$ (nx, ny, and nz being the indexes of refraction of the third layer in the slow axis direction, the fast axis direction, and the thickness direction thereof at a wavelength of 550 nm, respectively).

In an embodiment, the third layer may have an out-of-plane retardation of −300 nm to 0 nm, for example, −200 nm to −10 nm, at a wavelength of 550 nm. In an embodiment, the third layer may have an in-plane retardation of 0 nm to 10 nm, for example, 0 nm to 5 nm, at a wavelength of 550 nm. Within this range, the third layer can realize the aforementioned effect of reducing front reflectivity.

In an embodiment, the third layer may be formed of substantially the same material as the second layer. That is, the third layer may be formed of a composition including a halogen-containing polystyrene polymer, and, in an embodiment, a fluorine-containing polystyrene polymer, which has the repeat unit of Formula 1. In an embodiment, the fluorine-containing polystyrene polymer may be prepared by polymerizing a mixture including 1-(2,2-difluoroethenyl)-2-fluorobenzene and/or 1',2',2'-trifluorostyrene. The mixture may further include styrene.

Next, a method of manufacturing an optical film according to an embodiment will be described.

The optical film may be manufactured by forming a first primer layer on a non-stretched or partially stretched film for the first layer, coating a composition for the second layer on the first primer layer to form a coating for the second layer, followed by stretching the entirety of the film, the first primer layer, and the coating for the second layer. As a result, the optical film having the first layer, the first primer layer, and the second layer sequentially formed one above another can be manufactured.

In an embodiment, stretching may be performed by stretching the entirety of the film, the first primer layer, and the coating for the second layer to 1.1 times to 1.8 times an initial length thereof, and, in an embodiment, 1.1 times to 1.5 times, and, in an embodiment, 1.1 times to 1.3 times, and, in an embodiment, at 110° C. to 150° C. Stretching may be performed by uniaxially or bi-axially stretching the entirety of the film, the first primer layer, and the coating for the second layer in the machine direction (MD), transverse direction (TD), or oblique direction of the film.

Stretching may be performed by dry stretching or wet stretching. In an embodiment, dry stretching is performed to reduce variation in properties of a base film and a coating layer.

In an embodiment, the optical film may be manufactured by forming a first primer layer on a partially stretched film subjected to oblique stretching and coating a composition for the second layer on the first primer layer to form a coating for the second layer, followed by stretching the entirety of the first primer layer, the film, and the coating for the second layer. In another embodiment, the optical film may be manufactured by forming a first primer layer on a non-stretched film, stretching the first primer layer and the non-stretched film, and coating a composition for the second layer on the first primer layer to form a coating for the second layer, followed by stretching the entire laminate.

Polarizing Plate

A polarizing plate according to one or more embodiments of the present invention includes a polarizer and the optical film according to an embodiment of the present invention on at least one surface of the polarizer.

A polarizing plate according to an embodiment of the present invention includes a polarizer and the optical film according to an embodiment of the present invention on a lower surface of the polarizer.

Referring to FIG. 1, in an embodiment, a polarizing plate includes a protective layer 300, a polarizer 100, and an optical film, which includes a first layer 210, a first primer layer 220, and a second layer 230. In the polarizing plate, the first layer 210, the first primer layer 220, and the second layer 230 are sequentially formed on a lower surface of the polarizer 100.

In an embodiment, the first layer 210, the first primer layer 220, and the second layer 230 are substantially the same as those of the optical film described above.

The polarizer 100 may convert natural light or polarized light into polarized light through linear polarization in a certain direction. In an embodiment, the polarizer 100 may have a thickness of 2 μm to 30 μm, and, in an embodiment, 4 μm to 25 μm. Within this range, the polarizer can be used in the polarizing plate.

In an embodiment, the polarizer 100 may be fabricated from a polymer film mainly consisting of a polyvinyl alcohol resin. The protective layer 300 serves to protect the polarizer from an external environment while improving mechanical strength of the polarizing plate.

The protective layer 300 may include an optically transparent protective coating layer and/or an optically transparent protective film. The protective coating layer may include a coating layer formed of a composition containing an actinic radiation curable compound. The protective film is an optically transparent film and may include a film formed of at least one selected from among, for example, cellulose resins including triacetylcellulose (TAC) and the like, polyester resins including polyethylene terephthalate (PET), polybutylene terephthalate, polyethylene naphthalate, polybutylene naphthalate, and the like, cyclic polyolefin resins, polycarbonate resins, polyether sulfone resins, polysulfone resins, polyamide resins, polyimide resins, polyolefin resins, polyarylate resins, polyvinyl alcohol resins, polyvinyl chloride resins, and polyvinylidene chloride resins. In an embodiment, the protective film may be a TAC film or a PET film. In an embodiment, the protective layer 300 may have a thickness of 0.1 μm to 100 μm, and, in an embodiment, 5 μm to 70 μm, and, in an embodiment, 15 μm to 45 μm. Within this range, the protective film can be used in the polarizing plate. However, the polarizing plate may omit the protective layer 300 so long as the polarizing plate provides inherent functions thereof. Although not shown in FIG. 1, in an embodiment, the protective layer 300 may be bonded to the polarizer by a bonding layer. The bonding layer may be formed of a photocurable bonding agent and/or a water-based bonding layer, without being limited thereto.

Figure 2:
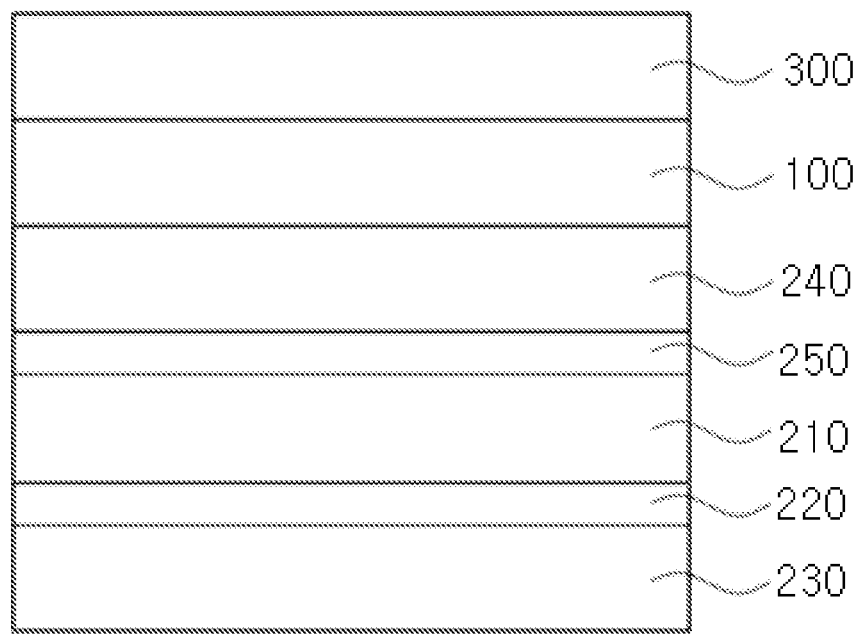
FIG. 2 is a cross-sectional view of a polarizing plate according to another embodiment of the present invention.

Referring to FIG. 2, in an embodiment, a polarizing plate includes a protective layer 300, a polarizer 100, and an optical film. In an embodiment, the optical film includes a third layer 240, a second primer layer 250, a first layer 210, a first primer layer 220, and a second layer 230. In the polarizing plate, the third layer 240, the second primer layer 250, the first layer 210, the first primer layer 220, and the second layer 230 are sequentially stacked on a lower surface of the polarizer 100.

In an embodiment, the first layer 210, the first primer layer 220, the second layer 230, the third layer 240, and the second primer layer 250 are substantially the same as those of the optical film described above. The polarizer 100 and the protective layer 300 may be substantially the same as those described with reference to FIG. 1.

Since the second primer layer 250 may be substantially the same as the first primer layer 220, the polarizing plate may include the third layer 240, the first primer layer 220, the first layer 210, the first primer layer 220, and the second layer 230 sequentially stacked on the lower surface of the polarizer 100.

Optical Display Apparatus

An optical display apparatus according to one or more embodiments of the present invention may include the optical film and/or the polarizing plate according to an embodiment of the present invention. In an embodiment, the optical display apparatus may include any of an organic light emitting diode (OLED) display and a liquid crystal display.

In an embodiment, the OLED display apparatus may include: an OLED panel including a flexible substrate; and the polarizing plate according to an embodiment of the present invention stacked on the OLED panel.

In another embodiment, the OLED display apparatus may include: an OLED panel including a non-flexible substrate; and the polarizing plate according to an embodiment of the present invention stacked on the OLED panel.

Next, the present invention will be described in further detail with reference to some examples. However, it is to be understood that these examples are provided for illustration and should not be construed in any way as limiting the present invention.

Example 1

A mixture including 45 parts by weight of a polyol (UPA-0103-5.5, DBE, Ltd.) and 55 parts by weight of isophorone diisocyanate (IPDI) dispersed in water was prepared, followed by polymerization of the mixture using dibutyltin dilaurate (DBTDL, TCI) as a polymerization catalyst, thereby preparing a urethane-based polymer. A water-dispersed composition for a first primer layer was prepared by mixing 13 parts by weight of the prepared urethane-based polymer, 5 parts by weight of hexamethylene diisocyanate trimer (HDI trimer), and 82 parts by weight of water.

A first primer layer was formed by coating the prepared composition for the first primer layer to a predetermined thickness on a lower surface of a cyclic olefin polymer (COP) film (ZD film, Zeon Film, Co., Ltd.) subjected to oblique stretching at an angle of 45° in the MD of the film.

A coating for a second layer was formed by coating a composition for the second layer (comprising a fluorine-containing polystyrene-based polymer) on a lower surface of the first primer layer, followed by drying the composition.

An optical film including the first layer (positive dispersion, thickness: 40 μm), the first primer layer (thickness: 200 nm), and the second layer (positive dispersion, thickness: about 5 μm) was manufactured by stretching a laminate of the COP film, the first primer layer, and the coating to 1.3 times an initial length thereof at 130° C. in a direction of 0° with reference to the MD of the COP film.

Example 2

An optical film including a first layer, a first primer layer, and a second layer sequentially stacked in the stated order was manufactured in the same manner as in Example 1. Thereafter, a first primer layer was formed on an upper surface of the first layer by depositing a composition for the first primer layer to a predetermined thickness thereon, followed by drying and curing. Next, a third layer was formed on an upper surface of the first primer layer by depositing a composition for the third layer (comprising a fluorine-containing polystyrene-based polymer), followed by drying the composition. As a result, an optical film including the third layer (positive C plate, thickness: 2 μm, Rth: −35 nm), the first layer (positive dispersion, thickness: 40 μm), the first primer layer (thickness: 200 nm), and the second layer (positive dispersion, thickness: about 6 μm) sequentially stacked in the stated order was manufactured.

Example 3

An optical film was manufactured in the same manner as in Example 2 except that the composition for the first primer layer was prepared by mixing 13 parts by weight of the urethane-based polymer, 10 parts by weight of hexamethylene diisocyanate trimer, and 77 parts by weight of water.

Example 4

An optical film was manufactured in the same manner as in Example 2 except that the composition for the first primer layer was prepared by mixing 13 parts by weight of the urethane-based polymer, 15 parts by weight of hexamethylene diisocyanate trimer, and 72 parts by weight of water.

Comparative Example 1

An optical film was manufactured in the same manner as in Example 2 except that an organic primer composition (free from a HDI trimer) comprising a polyester-based resin (Paraloid B-44, Dow Inc.) was used as the composition for the first primer layer.

Comparative Example 2

An optical film was manufactured in the same manner as in Example 2 except that a water-based primer composition (free from a HDI trimer) comprising 13 parts by weight of the urethane polymer, 5 parts by weight of a polyester-based resin (Paraloid B-44, Dow Inc.), and 82 parts by weight of water was used as the composition for the first primer layer.

Comparative Example 3

An optical film was manufactured in the same manner as in Example 2 except that a water-based primer composition (free from a HDI trimer) comprising 13 parts by weight of the urethane-based polymer and 87 parts by weight of water was used as the composition for the first primer layer.

Comparative Example 4

An optical film was manufactured in the same manner as in Example 2 except that a water-based primer composition (free from a HDI trimer) comprising 13 parts by weight of the urethane-based polymer, 5 parts by weight of butane diisocyanate (1,4-diisocyanatobutane, BDI), and 82 parts by weight of water was used as the composition for the first primer layer.

Comparative Example 5

An optical film was manufactured in the same manner as in Example 2 except that the composition for the first primer layer was prepared by mixing 13 parts by weight of a urethane polymer prepared through polymerization of the polyol and butane diisocyanate (BDI), 5 parts by weight of a hexamethylene diisocyanate trimer, and 82 parts by weight of water was used.

The optical films manufactured in the Examples and Comparative Examples were evaluated as to the following properties, and results are shown in Table 1.

(1) Haze (unit: %) and luminous transmittance (unit: %) of optical film: Haze and luminous transmittance of an optical film were measured using a haze meter (Nippon Denshoku Co., Ltd.) at a wavelength of 380 nm to 780 nm.

(2) Peel strength (unit: gf/25 mm): Each of the optical films was cut into a sample having a size of 25 mm×100 mm, which in turn was attached to an alkali-free glass plate via a pressure-sensitive adhesive using a laminator such that the second layer was adhered to the glass plate. Next, the sample was compressed in an autoclave (at 50° C. and 5 atm) for about 20 minutes and left under constant temperature and humidity conditions (23° C., 50% RH) for 4 hours. Thereafter, peel strength was measured using a peel strength tester (Texture analyzer, Stable Micro-System Inc., GB) at 25° C. under conditions: a peeling rate of 300 mm/min and a peeling angle of 180°. With the first layer, that is, the COP film, secured to the peel strength tester by a clip of the peel strength tester, interlayer primer peel strength between the first layer and the second layer was measured while pulling the sample from the second layer at an angle of 180° under constant force.

(3) Cross-cut of second layer: Adhesion was evaluated by a cross-cut method. Each of the optical films was cut into a square sample having a size of 10 mm×10 mm (length× width). Then, 10 longitudinal lines and 10 transverse lines were drawn on the sample, which in turn was cut to a depth of the first layer along the lines to divide the sample into a total of 100 pieces. An adhesive tape (General Consumables, Nichiban Co., Ltd.) was attached to the second layer, followed by counting the number of pieces remaining on the second layer upon peeling the adhesive tape off of the second layer. A greater number of pieces remaining on the second layer indicates better peel strength. 100 pieces remaining on the second layer was rated as 5B, 80 to less than 100 pieces remaining on the second layer was rated as 4B, 60 to less than 80 pieces remaining on the second layer was rated as 3B, 40 to less than 60 pieces remaining on the second layer was rated as 2B, and less than 40 pieces remaining on the second layer was rated as 1B.

(4) Durability when dipped in water at high temperature: The optical film was cut into a square specimen having a size of 10 mm×10 mm (length×width), which in turn was dipped in water at 100° C. and left for 1 hour. Thereafter, separation between the first layer and the second layer and between the first layer and the third layer was evaluated. No separation therebetween was rated as "○" and even slight separation therebetween was rated as "x".

(5) Re of first and second layers (unit: nm) and Rth of third layer (unit: nm): Re and Rth were measured at a wavelength of 550 nm using an AxoScan polarimeter (Axometry Co., Ltd.).

TABLE 1

| | Composition of primer layer | | | | | | | | Re | | Rth |
| | Base | Isocyanate for urethane based polymer | Isocyanate based curing agent | Primer layer Thickness (nm) | Haze | Transmittance | Peel strength | Cross-cut | Durability | $1^{st}$ layer | $2^{nd}$ layer | $3^{rd}$ layer |
|---|---|---|---|---|---|---|---|---|---|---|---|---|
| E1 | Urethane | IPDI | HDI trimer | 200 | 0.2 | 91.4 | 300 | 5B | ○ | 230 | 102 | — |
| E2 | Urethane | IPDI | HDI trimer | 200 | 0.2 | 91.3 | 300 | 5B | ○ | 230 | 102 | −35 |
| E3 | Urethane | IPDI | HDI trimer | 200 | 0.2 | 91.2 | 350 | 5B | ○ | 231 | 102 | −34 |
| E4 | Urethane | IPDI | HDI trimer | 200 | 0.3 | 91.1 | 400 | 5B | ○ | 230 | 101 | −35 |

TABLE 1-continued

| | Composition of primer layer | | | | | | | | | Re | | Rth |
| | | Isocyanate for urethane | Isocyanate based | Primer layer | | | | | | | | |
| | Base | based polymer | curing agent | Thickness (nm) | Haze | Transmittance | Peel strength | Cross-cut | Durability | 1st layer | 2nd layer | 3rd layer |
|---|---|---|---|---|---|---|---|---|---|---|---|---|
| CE1 | Polyester | — | — | 300 | 0.8 | 88 | 200 | 5B | x | 231 | 102 | −34 |
| CE2 | Urethane + Polyester | IPDI | — | 200 | 0.7 | 90.5 | 50 | 1B | x | 231 | 101 | −35 |
| CE3 | Urethane | IPDI | — | 200 | 0.15 | 91.4 | 80 | 2B | x | 230 | 101 | −35 |
| CE4 | Urethane | IPDI | BDI | 200 | 0.6 | 90.8 | 30 | 1B | x | 230 | 102 | −34 |
| CE5 | Urethane | BDI | HDI trimer | 200 | 0.5 | 90.9 | 30 | 1B | x | 230 | 102 | −35 |

E: Example, CE: Comparative Example

As shown in Table 1, the optical film according to embodiments of the present invention exhibits good peel strength between the first layer and the second layer including different materials and between the first layer and the third layer including different materials, and has low haze to secure good optical transparency. In addition, the optical film according to embodiments of the present invention includes a primer layer suppressing variation in shape and/or properties even after a stretching process in manufacture of the optical film to improve processability.

Conversely, the optical films of the Comparative Examples not including the primer layer failed to provide all of the effects of the present invention.

While some embodiments have been described herein, it is to be understood that various modifications, changes, alterations, and equivalent embodiments can be made by those skilled in the art without departing from the spirit and scope of the present invention.

What is claimed is:

1. An optical film comprising: a first layer; and a second layer stacked on a lower surface of the first layer via a first primer layer, the first primer layer being formed of a first composition comprising a first urethane-based polymer and a first isocyanate-based curing agent,
   wherein the first urethane-based polymer comprises a repeat unit derived from a first alicyclic isocyanate-based compound, and the first isocyanate-based curing agent comprises a first isocyanate-based trimer.

2. The optical film according to claim 1, wherein the first alicyclic isocyanate-based compound comprises at least one selected from among methylene bis(cyclohexyl isocyanate), cyclohexylene diisocyanate, cyclopentylene diisocyanate, 1,4-bis(isocyanatomethyl)cyclohexane, 1,3-bis(diisocyanatomethyl)cyclohexane, 3,5,5-trimethyl-3-isocyanatomethyl cyclohexane, and isophorone diisocyanate.

3. The optical film according to claim 1, wherein the first isocyanate-based trimer comprises a compound represented by the following Formula 3:

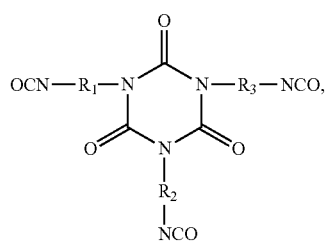

where $R_1$, $R_2$, and $R_3$ are each independently a substituted or unsubstituted $C_1$ to $C_{10}$ alkylene group, a substituted or unsubstituted $C_3$ to $C_{10}$ cycloalkylene group, or a substituted or unsubstituted $C_6$ to $C_{10}$ arylene group.

4. The optical film according to claim 1, wherein the first isocyanate-based trimer comprises at least one selected from among a hexamethylene diisocyanate trimer and an isophorone diisocyanate trimer.

5. The optical film according to claim 1, wherein the first isocyanate-based curing agent is present in an amount of 20 parts by weight to 160 parts by weight relative to 100 parts by weight of the first urethane-based polymer.

6. The optical film according to claim 1, wherein the first primer layer has a glass transition temperature of higher than 60° C.

7. The optical film according to claim 1, wherein the first layer and the second layer are formed of different materials and exhibit different birefringence.

8. The optical film according to claim 1, wherein each of the first layer and the second layer is a hydrophobic layer.

9. The optical film according to claim 1, wherein the first layer comprises at least one selected from among a cyclic olefin polymer (COP) resin and a cyclic olefin copolymer (COC), and the second layer comprises a halogen-containing polystyrene-based polymer.

10. The optical film according to claim 9, wherein a halogen of the halogen-containing polystyrene-based polymer is fluorine.

11. The optical film according to claim 9, wherein the halogen-containing polystyrene-based polymer comprises a repeat unit represented by the following Formula 1:

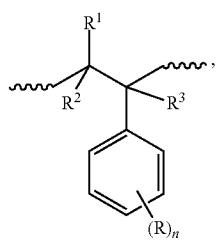

where ⁓⁓⁓ is a linking site;
$R^1$, $R^2$, and $R^3$ are each independently a hydrogen atom, an alkyl group, a substituted alkyl group, or a halogen;
each R is independently an alkyl group, a substituted alkyl group, a halogen, a hydroxyl group, a carboxyl group, a nitro group, an alkoxy group, an amino group, a sulfonate group, a phosphate group, an acyl group, an acyloxy group, a phenyl group, an alkoxy carbonyl group, or a cyano group, at least one of $R^1$, $R^2$, and $R^3$ being a halogen and/or at least one R being a halogen; and n is an integer of 0 to 5.

12. The optical film according to claim 1, wherein the first layer has an in-plane retardation of 180 nm to 240 nm at a wavelength of 550 nm, and the second layer has an in-plane retardation of 70 nm to 120 nm at a wavelength of 550 nm.

13. The optical film according to claim 1, further comprising a third layer stacked on an upper surface of the first layer via a second primer layer.

14. The optical film according to claim 13, wherein the first layer and the third layer are formed of different materials and exhibit different birefringence.

15. The optical film according to claim 13, wherein the first layer comprises at least one selected from among a cyclic olefin polymer (COP) resin and a cyclic olefin copolymer (COC), and the third layer comprises a halogen-containing polystyrene-based polymer.

16. The optical film according to claim 15, wherein the halogen-containing polystyrene-based polymer comprises a repeat unit represented by the following Formula 1:

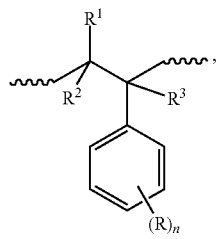

where ⁓⁓⁓ is a linking site;

$R^1$, $R^2$, and $R^3$ are each independently a hydrogen atom, an alkyl group, a substituted alkyl group, or a halogen;

each R is independently an alkyl group, a substituted alkyl group, a halogen, a hydroxyl group, a carboxyl group, a nitro group, an alkoxy group, an amino group, a sulfonate group, a phosphate group, an acyl group, an acyloxy group, a phenyl group, an alkoxy carbonyl group, or a cyano group, at least one of $R^1$, $R^2$, and $R^3$ being a halogen and/or at least one R being a halogen; and n is an integer of 0 to 5.

17. The optical film according to claim 13, wherein the second primer layer is formed of a second composition comprising a second urethane-based polymer and a second isocyanate-based curing agent, the second urethane-based polymer comprising a repeat unit derived from a second alicyclic isocyanate-based compound, the second isocyanate-based curing agent comprising a second isocyanate-based trimer.

18. The optical film according to claim 17, wherein the second isocyanate-based trimer comprises at least one selected from among a hexamethylene diisocyanate trimer and an isophorone diisocyanate trimer, and the second alicyclic isocyanate-based compound comprises at least one selected from among methylene bis(cyclohexyl isocyanate), cyclohexylene diisocyanate, cyclopentylene diisocyanate, 1,4-bis(isocyanatomethyl)cyclohexane, 1,3-bis(diisocyanatomethyl)cyclohexane, 3,5,5-trimethyl-3-isocyanatomethyl cyclohexane, and isophorone diisocyanate.

19. A polarizing plate comprising: a polarizer and the optical film according to claim 1 on at least one surface of the polarizer.

20. An optical display apparatus comprising the polarizing plate according to claim 19.

* * * * *